Figure 1:
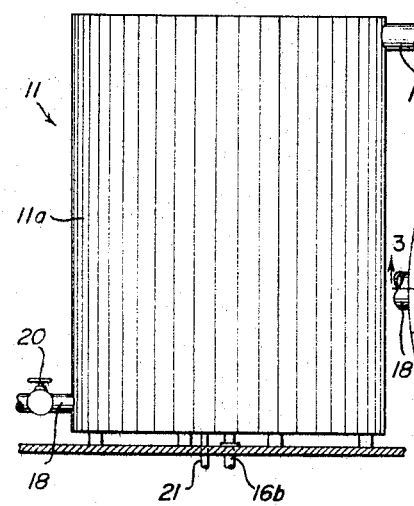

Aug. 1, 1967     S. R. ZIMMERLEY ET AL     3,333,953
PROCESS AND APPARATUS FOR THE PRECIPITATION OF SUBSTANCES
FROM SOLUTION USING SOLID PRECIPITANTS
Filed Oct. 28, 1963

INVENTORS
STUART R. ZIMMERLEY
EMIL E. MALOUF
BY
Mallinckrodt and
Mallinckrodt
ATTORNEYS United States Patent Office 3,333,953
Patented Aug. 1, 1967

3,333,953
PROCESS AND APPARATUS FOR THE PRECIPITATION OF SUBSTANCES FROM SOLUTION USING SOLID PRECIPITANTS
Stuart R. Zimmerley and Emil E. Malouf, Salt Lake City, Utah, assignors to Kennecott Copper Corporation, New York, N.Y., a corporation of New York
Filed Oct. 28, 1963, Ser. No. 319,302
18 Claims. (Cl. 75—109)

This invention relates to processes and apparatus for precipitating substances from solution, especially metals, such as copper, from aqueous solutions containing same, for example, highly dilute acid waters from copper mines, waters which have been percolated through waste dumps of copper mines, and solutions high in either copper or acid or both, such as solutions obtained in vat or heap leaching of copper ores and in the recovery of copper from strong electrolyte solutions as encountered in copper electrolyte refineries.

The use of scrap iron for copper precipitation from natural mine waters is not very efficient as normally carried out. The scrap iron is placed in long launders through which the copper-bearing solution is passed. Exposed surfaces of the metallic iron are rapidly coated with copper and become passive and no longer effective for copper precipitation. If the available iron is to be effectively utilized, even though the scrap employed is in thin strip form, such as shredded de-tinned cans, the so-coated iron must be rinsed with a high pressure stream of wash water, e.g. from a fire hose. This is a burdensome task considering the length of launders used for the purpose.

In the copending application of Alexander E. Back, Kenneth E. Fisher, and John Kocherhans, Ser. No. 181,001, filed Mar. 20, 1962, now U.S. Patent No. 3,154,411, issued Oct. 27, 1964, there is disclosed a process and apparatus utilizing sponge or other types of finely divided metallic iron for the precipitation of copper from dilute acid solutions of the type here concerned. The apparatus includes at least one vessel of inverted conical formation for retaining a mass of the finely divided metallic iron precipitant in dynamic suspension as the copper-bearing solution is passed upwardly through and from the apex of such vessel and out over the rim thereof as spent solution following intimate contact with the iron, the copper precipitate being discharged from the vessel periodically.

The same apparatus and procedure are not applicable to the use of scrap iron as a precipitant, although the general principle is an attractive one.

The present invention is concerned with making it possible to effectively carry out precipitation of copper on a variety of forms of scrap iron in a generally similar type of vessel, free from problems of surface blinding of the iron by deposited copper. It is also concerned with providing an all-purpose process and apparatus not limited to the use of scrap iron as a precipitant but applicable to precipitants in any form.

Principal objects in the making of the present invention were to enable precipitation of copper from solution on scrap iron in a vessel which enables reasonably close control of the process and effective separation of the precipitated copper from the scrap iron precipitant; to provide for continuous scouring of deposited copper from the surfaces of the scrap iron; to provide for easy and, if desired, continuous charging of the scrap iron into the vessel and for easy and, if desired, continuous discharging of precipitated copper from the vessel; and to provide, in general, improved process and apparatus for the continuous precipitation of substances from solution, using solid precipitants, whereby dewatering of the precipitate product is achieved as an incident of its recovery.

In the accomplishment of these objectives, outstanding features of the process are the charging, either continuously or intermittently, of the scrap iron or other solid precipitant into a treatment vessel having an overflow rim and defining a reaction zone; forcibly projecting the pregnant solution into the treatment vessel and into intimate contact with the precipitant, as a multiplicity of scrubbing jets in the instance of scrap iron precipitant; confining the solution both above and below the rim of the treatment vessel, so that a rim-overflowing portion thereof drops below and the greater part thereof rises above such overflow rim into and through a superimposed quiescent zone, which, in the instance of scrap iron precipitant at least, is charged with such precipitant as a filter bed; discharging such greater part of the solution from the upper part of the quiescent zone as spent solution, preferably by peripheral overflow; and bleeding off, either continuously or intermittently, from the confined solution below the overflow rim of the treatment vessel a slurry of precipitate as the valued product of the process.

Outstanding features of the apparatus are the provision of a precipitant treatment vessel, preferably of inverted conical formation, having an open top and peripheral overflow rim, which discharges into a surrounding catch receptacle whose walls are spaced from the overflow rim of the treatment vessel and drop therebelow and rise thereabove to catch the valued precipitate as it settles and to confine solution rising above the overflow rim of the treatment vessel; in the instance of scrap iron as the precipitant, a supporting screen bridging the space between the overflow rim of the treatment vessel and the surrounding walls of the catch receptacle; means for forcibly introducing a pregnant solution into the lower portion of the treatment vessel in intimate contact with the contained precipitant, such means being, in the instance of scrap iron as the precipitant, an open framework of solution-inflow piping having jet discharge orifices disposed at intervals therealong; discharge means, preferably a peripheral overflow lip and launder, at the upper part of the catch receptacle above the spent solution overflow lip of the treatment vessel; and discharge means, preferably a valved pipe, at the lower part of the catch receptacle below the overflow lip of the treatment vessel for a slurry of the valued precipitate.

There is illustrated in the accompanying drawings a specific embodiment of apparatus representing what is presently regarded as the best mode of carrying out the invention. From the detailed description of this, other more specific objects and features will become apparent.

Figure 2:
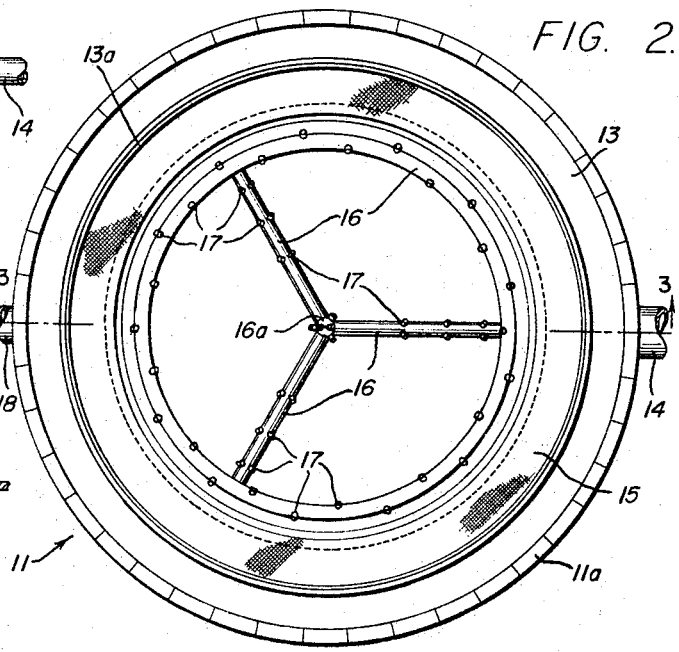
Figure 3:
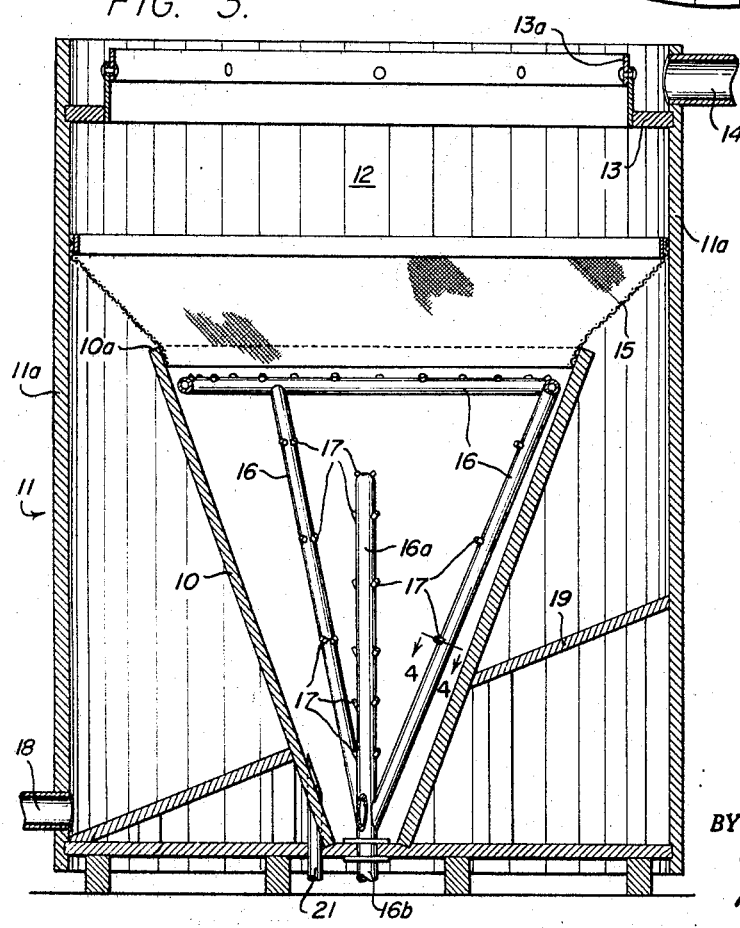

In the drawings:

FIG. 1 represents a side elevation of the apparatus;

FIG. 2, a top plan view;

FIG. 3, an axial vertical section taken on the line 3—3 of FIG. 2; and

Figure 4:
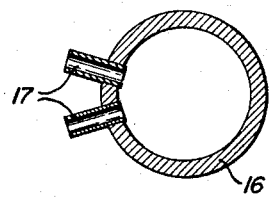

FIG. 4, a detail view in horizontal section taken on the line 4—4 of FIG. 3 and drawn to a considerably larger scale.

Referring to the drawings:

A precipitant treatment vessel 10, preferably of inverted conical formation, as shown, is, in this instance, constructed wholly within a larger catch receptacle 11 of open-topped cylindrical formation. Treatment vessel 10 is also open-topped, so that scrap iron or other solid precipitant can be easily charged thereinto as and when required. Its top provides a peripheral overflow rim 10a for solution rising from its bottom, and the walls of catch receptacle 11 extends above such overflow rim to confine the rising solution and to provide a relatively quiescent zone 12 therefor above the overflow rim 10a.

Both treatment vessel 10 and catch receptacle 11 are advantageously constructed of wood slats in well known manner in order to resist the acidic character of the waters to be treated.

The upper limit of quiescent zone 12 is established, in this instance, by a peripheral overflow lip 13a leading into a peripheral launder 13 which has a discharge pipe 14 for the spent solution rising through such quiescent zone. As shown, the lip 13a is advantageously adjustable in height, so the overflow level for spent solution can be varied within predetermined limits and so that its level can be precisely adjusted.

In those instances where scrap iron is the precipitant and in other instances wherein scrap iron is employed in the quiescent zone for spent solution filtering purposes, a screen 15—desirably of about one inch mesh—is provided to bridge the gap otherwise existing between overflow rim 10a of the treatment vessel and the surrounding walls 11a of catch receptacle 11 as a support for scrap iron marginally disposed in the quiescent zone.

In those instances where scrap iron is the precipitant, it will be charged into treatment vessel 10 and on up in catch receptacle 11 to the vicinity of overflow lip 13a, more or less, as a superimposed filter bed to catch particles of precipitate, which may rise with the solution, and to thereby prevent its loss with the spent solution overflowing into overflow launder 13. Such filter bed of scrap iron also serves to strip whatever values may be left in solution to insure maximum precipitation of such values. It descends progressively into treatment vessel 10, i.e. into the reacton zone, as the scrap iron in such vessel is replaced by copper from solution, and is replenished either periodically or continuously from above with fresh scrap as the process continues.

In those instances where the precipitant is in particulate form, e.g. sponge iron, it may or may not be desirable to utilize a filter bed of scrap iron above the overflow rim 10a of the treatment vessel. If not, no screen is necessary and the outflow for spent solution will be located high enough to give a quiescent zone of adequate depth to accomplish desired settling of precipitate before outflow of the spent solution; if so, the screen 15 should be extended entirely across the open top of treatment vessel 10, it being understood that, in instances of such finely divided material being used as the precipitant, it will be charged into such treatment vessel in much the same manner as shown by the aforementioned copending application Ser. No. 181,001 or by Sulman U.S. Patent No. 587,408.

The pregnant solution to be treated is passed into and through the precipitant-containing treatment vessel, i.e. into the reaction zone, in intimate contact with the precipiant. To this end, treatment vessel 10, which is primarily intended for the use of scrap iron as the precipitant, is equipped with an open framework 16 of solution-inflow piping, having a center pipe 16a of major capacity and a multiplicity of jet nozzles 17 at intervals along the lengths of the piping and directed toward the spaces to be charged with scrap iron. Such nozzles 17 are preferably directed upwardly as illustrated and have adequate discharge capacity to project vigorous, scrubbing jets of the pregnant solution against the scrap iron precipitant. This and the resultant turbulence in the body of solution within the treatment vessel effectively keep the surfaces of the scrap iron free of precipitate so long as there is metallic iron remaining.

Initially, the pregnant solution rises in treatment vessel 10, losing its copper content to the precipitant and spilling over the overflow rim 10a thereof, until catch receptacle 11 is filled, and then continuing to rise through quiescent zone 12 as spent solution until, finally, it spills over overflow lip 13a into outflow launder 13 and flows to discharge through pipe 14.

The precipitate copper rises with the solution in treatment vessel 10 and settles out as the solution passes through quiescent zone 12. Much of it settles down into catch receptacle 11, passing easily through the comparatively large perforations of screen 15. The remainder settles back toward the treatment vessel, until, again dynamically lifted by the rising currents of solution, eventually it finds its way through screen 15 into the catch receptacle.

It should be noted that the solution is confined both below and above overflow rim 10a of the treatment vessel and that the precipitate drops below such overflow rim and is thereby segregated from the precipitant for discharge as a slurry at a location removed from such precipitant. Although precipitation vessel 10 is here shown as being wholly within catch receptacle 11 so that the bottoms of both are at the same level, it is obvious that the catch receptacle can be of the nature of a launder surrounding overflow rim 10a if desired for some applications of the invention.

An outlet, here a discharge pipe 18, for precipitate slurry is provided in the lower part of the catch receptacle, advantageously at the low point of a sloping floor or false bottom 19. A valve 20 is preferably provided in such pipe, so that discharge can be effected periodically or continuously, as desired, and can be controlled quantitatively. Even though the catch receptacle is filled with solution, the valued precipitate settles to the bottom and can be bled off as a slurry which requires only a minimum of dewatering. It will be realized that the bulk of the solution is taken off through overflow launder 13 and outflow pipe 14.

Inflow piping 16, it should be noted, receives its supply of pregnant solution by connection with a header pipe 16b entering treatment vessel 10 at its base and connected with any suitable source of such solution, e.g., a pump (not shown).

For cleanout purposes, a drain pipe 21 is provided at or near the bottom of treatment vessel 10, being normally closed against outflow by means of a manually-controlled valve (not shown) at some convenient location along its length.

Results obtained in a series of tests indicate that a catch receptacle 11, having a diameter of fourteen feet and a height of twenty-four feet, with a treatment vessel having a diameter of ten feet and a height of eleven feet, will remove more than ninety-eight percent of the copper from at least two million gallons of copper-bearing solutions per day containing copper in excess of thirty pounds per one thousand gallons, there being enough scrap iron used to keep the level thereof near or above the spent solution overflow level.

On a comparable basis the requirement to handle two million gallons per day in a conventional launder-type copper precipitation plant would be over one thousand feet of four foot by four foot launders, and even then no more than ninety percent recovery of the copper could be expected. Moreover, when it becomes necessary to remove the copper precipitates from such a launder-type plant, all flow of copper-bearing solutions through the plant must be discontinued and the copper precipitates sluiced from the launders by the use of fire hoses.

Although wood construction for the apparatus is specifically shown and described, it should be understood that other acid-resistant materials, such as stainless steel, may be employed if desired.

In those instances where a finely-divided, metallic, iron precipitant is used instead of scrap iron, present indications on the basis of laboratory experiments are that difficulties due to the generation of gas and the tendency for gas bubbles to float particles of precipitate are largely eliminated by reason of the bleeding-off discharge of precipitate slurry at the bottom of the catch receptacle and of the resultant overflow of solution at the overflow rim of the treatment vessel. It should be noted that, even where this discharge is periodic, it is carried out while the apparatus is in operation. Moreover, by providing sufficient height for the quiescent zone or by using a filter bed of scrap iron therein, the problem of loss of precipitate, with the spent or impoverished solution discharge, is minimized if not entirely eliminated. The same is true where the rate of feed of the precipitant is quantitatively only slightly in excess of the stoichiometric amount to satisfy the copper content of the pregnant solution passing through the treatment vessel.

Should gassing still pose a problem, degassing can be carried out as disclosed in the aforementioned copending application of Back et al., Ser. No. 181,001.

Whereas there are here specifically set forth certain preferred procedures and apparatus which are presently regarded as the best mode of carrying out the invention, it should be understood that various changes may be made without departing from the inventive subject matter particularly pointed out and claimed herebelow.

We claim:

1. Metallurgical precipitation apparatus, comprising a treatment vessel adapted to contain a mass of precipitant, said vessel defining a reaction zone having an open top with a peripheral overflow rim; a catch receptacle surrounding said overflow rim in spaced relationship therewith, rising thereabove to define a relatively quiescent zone for spent solution from the treatment vessel and extending therebelow to catch valued precipitate as it settles between said overflow rim and the surrounding walls of the catch receptacle from the depleted solution in said quiescent zone; discharge means for depleted solution leading from the catch receptacle at a high level thereof above said overflow rim of the treatment vessel and establishing the top of said quiescent zone; discharge means for precipitate slurry leading from the catch receptacle at a low level thereof below said overflow rim of the treatment vessel; and means for passing a pregnant solution upwardly through the treatment vessel in intimate contact with the precipitant therein.

2. The apparatus of claim 1, wherein there is additionally provided a screen bridging the space between the overflow rim of the treatment vessel and the surrounding walls of the catch receptacle for supporting a scrap iron precipitant.

3. The apparatus of claim 2, wherein the means for passing a pregnant solution through the treatment vessel comprises an open framework of solution-inflow piping and a multiplicity of jet nozzles at intervals along the length of said piping.

4. The apparatus of claim 3, wherein the catch receptacle is also open-topped for convenient charging of scrap iron into the apparatus.

5. The apparatus of claim 1, wherein the discharge means for depleted solution comprises a peripheral overflow lip.

6. The apparatus of claim 1, wherein the discharge means for valued precipitate slurry comprises a valved discharge pipe.

7. The apparatus of claim 1, wherein the treatment vessel is of inverted, substantially conical formation.

8. Metallurgical precipitation apparatus, comprising a treatment vessel defining a reaction zone of inverted, substantially conical formation, having an open top with a peripheral overflow rim and adapted to contain a mass of scrap iron precipitant; a larger catch receptacle wholly containing the treatment vessel in laterally spaced relationship therewith and extending thereabove; screen means extending about the overflow rim of the treatment vessel and bridging the space between said vessel and said receptacle as a support for upper portions of the mass of scrap iron; means for passing a pregnant solution into and through the treatment vessel in intimate contact with the scrap iron therein; discharge means for depleted solution leading from the catch receptacle at a level spaced above the overflow rim of the treatment vessel; and discharge means for precipitate slurry leading from a lower part of the catch receptacle below said overflow rim of the treatment vessel.

9. The apparatus of claim 8, wherein the discharge means above the screen for depleted solution is a peripheral overflow launder.

10. The apparatus of claim 8, wherein the catch receptacle has a sloping floor and the discharge means below the screen for precipitate slurry is located at the lowest level of said floor.

11. The apparatus of claim 8, wherein the means for passing a pregnant solution into and through the treatment vessel is an open framework of solution-inflow piping, having jet discharge orifices disposed at intervals therealong and a supply header entering the treatment vessel at its base.

12. Apparatus for recovering copper from a pregnant leaching solution, comprising
treatment vessel means defining a reaction zone adapted to contain metallic iron precipitant and a body of pregnant leaching solution in intimate reactive contact;
means for injecting additional pregnant leaching solution into said reaction zone at a velocity sufficient to dislodge precipitate copper from the surfaces of said metallic iron precipitant;
catch receptacle means adjoining said treatment vessel means for receiving the dislodged precipitate copper;
solution confining means defining a quiescent zone above both said treatment vessel means and said catch receptacle means, so solution flowing upwardly from said reaction zone will carry dislodged precipitate copper into said quiescent zone, where it can settle into said catch receptacle means;
means for overflowing depleted solution from above said quiescent zone; and
means for removing the settled precipitate copper from said catch receptacle means.

13. A process of recovering metal values from solutions in which they are dissolved, comprising the steps of
maintaining within a reaction zone a body of such a metal-bearing solution about a mass of a precipitant metal in reactive contact therewith;
introducing additional quantities of the metal-bearing solution into said body within said reaction zone in reactive with said precipitant metal and with sufficient force to dislodge precipitate metal therefrom;
flowing the solution, that has been depleted of dissolved metal content, along with the dislodged precipitate metal upwardly into a relative quiescent zone above said body of said of solution;
maintaining a relatively quiescent body of depleted solution in adjoining relationship with the first-named body of solution;
settling precipitate metal from the solution in said quiescent zone into said body of depleted solution;
overflowing depleted solution from said quiescent zone; and
discharging settled precipitate and some of the solution from said body of depleted solution.

14. A process according to claim 13, wherein the metal-bearing solution carries dissolved copper values, the precipitant metal is metallic iron, and a mass of scrap iron is maintained in the relatively quiescent zone.

15. A process according to claim 14, wherein the precipitant metal is scrap iron.

16. A process according to claim 13, wherein additional precipitant metal is supplied at the top of the mass of precipitant metal at a rate slightly in excess of the stoichiometric amount necessary to satisfy the additional quantities of the metal-bearing solution introduced into the body of same.

17. A process according to claim 14, wherein the relatively quiescent body of depleted solution surrounds the body of metal-bearing solution below the relatively quiescent zone.

18. A process according to claim 13, wherein the streams of metal-bearing solution are in the form of jets spaced along both the breadth and the height of the reaction zone to exert a strong scrubbing action on the precipitant metal therein.

References Cited
UNITED STATES PATENTS

| | | | |
|---|---|---|---|
| 587,408 | 8/1897 | Sulman | 75—108 |
| 779,252 | 1/1905 | Baggaley | 75—109 |
| 860,661 | 1/1907 | Hendryx | 75—109 |
| 1,125,590 | 1/1915 | Nunez | 23—272.6 |
| 1,156,383 | 10/1915 | Towne et al. | 75—109 |
| 1,217,437 | 2/1917 | Gahl | 75—109 |
| 1,856,661 | 5/1937 | Sherwood | 75—109 |
| 2,083,076 | 6/1937 | Mau | 32—311 |
| 3,092,490 | 6/1963 | Ednie | 75—26 |
| 3,117,000 | 1/1964 | Schlain et al. | 75—109 |
| 3,154,411 | 10/1964 | Back et al. | 75—109 |
| 3,164,443 | 1/1965 | Watson | 23—276 |
| 3,194,653 | 7/1965 | Keyes | 75—109 |
| 3,195,984 | 7/1965 | Sands | 23—276 |

DAVID L. RECK, *Primary Examiner.*

HYLAND BIZOT, *Examiner.*

N. F. MARKVA, *Assistant Examiner.*